(12) United States Patent
Yoshino

(10) Patent No.: US 6,508,523 B2
(45) Date of Patent: Jan. 21, 2003

(54) CONTROL METHOD FOR A COORDINATED REGENERATIVE BRAKE SYSTEM

(75) Inventor: Masato Yoshino, Itami (JP)

(73) Assignee: Sumitomo (SEI) Brake Systems, Inc., Mie-Pref (JP)

( * ) Notice: Subject to any disclaimer, the term of this patent is extended or adjusted under 35 U.S.C. 154(b) by 0 days.

(21) Appl. No.: 09/781,287

(22) Filed: Feb. 13, 2001

(65) Prior Publication Data

US 2001/0024062 A1 Sep. 27, 2001

(30) Foreign Application Priority Data

Mar. 24, 2000 (JP) ........................................ 2000-084015

(51) Int. Cl.⁷ ............................................. B60T 13/74
(52) U.S. Cl. .......................................... 303/152; 303/3
(58) Field of Search ............ 303/3, 152; 180/65.2–65.8

(56) References Cited

U.S. PATENT DOCUMENTS

| 4,962,969 A | * | 10/1990 | Davis ............................. 303/3 |
| 6,086,166 A | * | 7/2000 | Fukasawa .................... 303/152 |
| 6,120,115 A | * | 9/2000 | Manabe ....................... 303/152 |
| 6,321,144 B1 | * | 11/2001 | Crombez ..................... 701/22 |

FOREIGN PATENT DOCUMENTS

JP 06153315 5/1994

OTHER PUBLICATIONS

English Language Abstract of JP 06–153315.

* cited by examiner

Primary Examiner—Christopher P. Schwartz
(74) Attorney, Agent, or Firm—Greenblum & Bernstein, P.L.C.

(57) ABSTRACT

A coordinated regenerative brake system controls total brake torque to brake a vehicle in accordance with brake pedal operation and achieve deceleration intended by the driver's operation of the brakes when the accelerator is not depressed. In a vehicle speed range below specific speed V1, engine brake equivalent torque Ta is set to decrease gradually to zero in accordance with vehicle speed V. When brake operation starts at a vehicle speed exceeding V1, the desired total brake torque Tq working on the vehicle is the sum of brake torque Tb corresponding to brake operation, and engine brake equivalent torque Ta, until vehicle speed reaches specific speed V1. When vehicle speed is V1 or less, brake torque is controlled using as desired total brake torque Tq the sum of brake torque Tb corresponding to brake operation, and first engine brake equivalent torque Ta1, if brake operation amount Sb is greater than or equal to a first brake operation amount Sb1.

10 Claims, 7 Drawing Sheets

CONTROL METHOD FOR A COORDINATED REGENERATIVE BRAKE SYSTEM

BACKGROUND OF THE INVENTION

1. Field of the Invention

The present invention relates to a control method for a coordinated regenerative brake-system in an electric vehicle.

2. Description of Related Art

Electric vehicles having an electric motor or other electrical drive source as the drive source creating drive power for the vehicle typically have a brake system that uses both frictional brake torque produced by a hydraulic mechanism of some kind, and regenerative brake torque produced by converting some of the vehicle's kinetic energy to electrical energy that is stored in the vehicle's battery. It is to be noted that "electric vehicle" as used in this specification includes so-called hybrid vehicles that are capable of using drive power from an internal combustion engine as well as electrical drive power.

When brake torque is applied to the wheels using both friction and regenerative brake torque, coordinated regenerative braking is used to coordinate the two braking mechanisms so that the timing and balance of torque from the two systems is good and the total brake torque developed is in accordance with the brake torque intended by the driver. In other words, coordinated regenerative braking blends the brake force developed by the two systems so that operation is transparent to the user and corresponds to the driver's operation state of the brakes (such as how far the brake pedal is depressed). When the total required brake torque is less than the maximum achievable regenerative brake torque, which depends on vehicle speed and battery capacity, coordinated regenerative braking supplies the required brake torque using only the regenerative brake system, but when the required brake torque exceeds this limit, that is, exceeds the maximum achievable regenerative brake torque, the deficient part of the required brake torque is produced using the friction brake system.

Various measures have been taken in electric vehicles equipped with a coordinated regenerative brake system to eliminate differences in the feel between the electric vehicle and a conventional engine-powered vehicle so as to eliminate any driver discomfiture and resistance to driving an electric vehicle resulting from an unaccustomed feel in brake behavior. These measures included developing a method for controlling the coordinated regenerative braking system during vehicle braking so that braking an electric vehicle feels as much as possible identical to braking a conventional engine-powered vehicle.

For example, with a conventional vehicle it is possible to apply brake the vehicle by operating the brake pedal, or by applying a so-called engine brake by letting up on or completely releasing the accelerator pedal under specific conditions so that it is not depressed at all. An engine brake is commonly used when, for example, travelling down a relatively steep, long slope or applying the brakes continuously for a relatively long period of time.

To make braking feel qualitatively the same in conventional and electric vehicles, methods for controlling the coordinated regenerative braking system so as to produce brake torque equivalent to the engine brake produced during normal vehicle deceleration have been proposed. See, for example, Japanese Patent Laid-Open Publication Hei 6-153315. In this prior art, brake torque equivalent to the engine brake is given by regenerative brake torque as the brake torque in accordance with the operational state of accelerator pedal.

Problem to be Solved

It is commonly known that brake torque comparable to engine brake torque in a conventional vehicle decreases as vehicle speed and engine speed decrease. When using regenerative brake torque, however, it is possible to maintain a constant brake torque comparable to engine brake torque to a very low speed when compared with a conventional engine-powered vehicle.

If, however, braking with this constant torque continues to the extremely low speed at which regeneration is possible, this constant brake torque will be applied until immediately before the vehicle stops. This makes it very difficult to come to a smooth, natural stop at a particular position in the same way that a conventional vehicle can. Furthermore, regenerative brake torque goes substantially to zero at the regeneration limit speed immediately before the vehicle stops, resulting in a sudden discomfiting loss of deceleration that produces driver discomfiture and resistance to braking, also makes working the brakes to come to a stop at a specific point difficult.

SUMMARY OF THE INVENTION

To resolve the above noted problems, the invention provides a method for controlling the coordinated regenerative braking system of an electric vehicle so that total brake torque is applied to the vehicle in accordance with brake pedal operational state, thereby assuring that vehicle deceleration is commensurate with the braking intention of the driver when the accelerator pedal is not depressed during vehicle deceleration.

As illustrated in FIG. 7, the invention is based on setting brake torque $T_a$, which is equivalent to the engine brake torque to be applied to the vehicle when accelerator pedal operation amount $S_a$ (accelerator pedal depression) is zero, so that it decreases gradually according to vehicle speed $V$ in a vehicle speed range below a specific speed $V_1$, which is set to a relatively low speed such as approximately 20 km/h.

However, when brake torque $T_a$ is set as described above, and the driver works the brake pedal to achieve a desired vehicle deceleration after letting up on or completely releasing the accelerator pedal so that accelerator pedal depression $S_a$ is actually zero (i.e., is not depressed at all), engine brake equivalent torque $T_a$ decreases in accordance with vehicle speed $V$ regardless of driver intentions in the vehicle speed range below or equal to specific speed $V_1$. It is therefore not possible to achieve vehicle braking as desired by the driver.

In the example shown in FIG. 7 the sum of brake torque $T_b$, which corresponds to brake pedal depression $S_b$, and brake torque $T_a$ (that is, torque equivalent to the engine brake torque), which corresponds to accelerator pedal depression $S_a$, is normally the desired total brake torque $T_q$ to be developed and applied to the vehicle. However, because engine brake equivalent torque $T_a$ decreases gradually according to vehicle speed $V$ in the vehicle speed range below specific speed $V_1$ even if the driver keeps brake pedal depression $S_b$ constant in order to achieve constant vehicle deceleration, the total brake torque $T_q$ acting on the vehicle decreases in conjunction with the drop in torque $T_a$, and vehicle. deceleration decreases contrary to the driver's intention. This means that it is necessary to further depress the brake pedal in order to maintain the constant vehicle deceleration desired by the driver. This can be discomfiting and unnatural to a driver accustomed to driving a conventional engine-powered vehicle, and makes vehicle braking and deceleration control difficult.

To resolve this problem, a first aspect of the present invention provides a control method for a coordinated regenerative brake system in which the total brake torque to be applied to a vehicle is produced by coordinating friction brake torque and regenerative brake torque, and specifically controls [a] in a vehicle speed range less than or equal to this specific value (V1), when accelerator operator operation amount (Sa) is effectively zero, a brake torque (Ta) equivalent to engine brake torque working on the vehicle is set to be controlled to approach gradually zero in accordance with vehicle speed (V). Furthermore, when [b] brake operator operation starts in a vehicle speed range exceeding the specific value (V1), brake torque is controlled [b1] using as a desired total brake torque (Tq) for the vehicle in the vehicle speed range exceeding the specific value (V1), a sum of brake torque (Tb) corresponding to operational state of a brake operator, and brake torque (Ta) corresponding to operational state of accelerator operator. In [b2] the vehicle speed range less than or equal to the specific value (V1), [b3] using as the desired total brake torque (Tq) the sum of brake torque (Tb) corresponding to operational state of a brake operator, and first engine brake equivalent torque (Ta1), which is comparable to engine brake torque when vehicle speed (V) reaches the specific value (V1), when brake operator operation amount (Sb) is equal to or greater than a first brake operator operation amount (Sb1), which is brake operator operation when the vehicle speed (V) reaches the specific value (V1); and [b4] using as the desired total brake torque (Tq), when brake operator operation amount (Sb) is less than the first brake operator operation amount (Sb1), the sum of brake torque (Tb) corresponding to operational state of a brake operator, and torque (Ta') calculated to approach brake torque (Ta), which corresponds to operational state of an accelerator operator, from first engine brake equivalent torque (Ta1) in accordance with the reduction ratio of brake operator operation amount (Sb).

According to the first aspect of the invention, by controlling brake torque Ta, which is equivalent to the engine brake torque in a conventional vehicle, so that it gradually goes to zero in accordance with the drop in vehicle speed V in a vehicle speed range equal to or below a specific speed (V1), which is set to a relatively low speed range, it is possible to improve problems presented by the related art, and achieve relatively natural deceleration and stopping comparable to a conventional engine-powered vehicle. As noted above, these problems include difficulty operating the brakes to stop at a particular point when a constant brake torque equivalent to engine brake torque continues working until immediately before the vehicle stops, and the sudden loss of deceleration that occurs when regenerative brake torque (equivalent to engine brake torque) goes suddenly to zero at the regeneration limit speed immediately before the vehicle stops.

Furthermore, with keeping such a effect, brake torque is controlled using as the desired total brake torque (Tq) of the vehicle the sum of brake torque (Tb) corresponding to operational state of a brake operator, and brake torque (Ta) corresponding to operational state of an accelerator operator, when operation of the brake operator begins in the vehicle speed range above the specific speed V1. It is therefore additionally possible to apply total brake torque to the vehicle in accordance with operational state of the brake operator (that is, in accordance with the braking intended by the driver).

Yet further, in the vehicle speed range equal to or below the specific speed V1, brake torque is controlled using as the desired total brake torque (Tq) of the vehicle the sum of brake torque (Tb) corresponding to operational state of a brake operator, and first engine brake equivalent torque (Ta1), which is comparable to engine brake torque at the specific speed (V1), if brake operator operation amount (Sb) is equal to or greater than a first brake operator operation amount (Sb1) at the specific speed (V1). As a result, a drop in vehicle deceleration not in accordance with the driver's intention can be prevented even in the vehicle speed range below specific speed V1, and total brake torque can be applied to the vehicle as desired by the driver.

Yet further, when brake operator operation amount (Sb) is less than a first brake operator operation amount (Sb1), brake torque is controlled using as the desired total brake torque (Tq) of the vehicle the sum of brake torque (Tb) corresponding to operational state of a brake operator, and torque (Ta') calculated to approach brake torque (Ta) corresponding to operation of an accelerator operator from first engine brake equivalent torque (Ta1) in accordance with the reduction ratio in brake operator operation amount (Sb) It is therefore possible in this case, too, to faithfully brake as intended by the driver, and achieve relatively natural vehicle deceleration and stopping.

Further preferably, in a second aspect of the present invention, when brake operator operation starts in a vehicle speed range less than or equal to the specific value (V1), brake torque is controlled [c] using as the desired total brake torque (Tq), while brake operator operation amount (Sb) is increasing, a sum of brake torque (Tb) corresponding to operational state of a brake operator, and second engine brake equivalent torque (Ta2), which is equivalent to engine brake torque at the start of brake operator operation; and [d] using as the desired total brake torque (Tq), when brake operator operation amount (Sb) decreases, a sum of brake torque (Tb) corresponding to operational state of a brake operator, and torque (Ta"), which is calculated to approach brake torque (Ta) corresponding to operational state of an accelerator operator from second engine brake equivalent torque (Ta2) in accordance with the reduction ratio of brake operator operation amount (Sb) from a relative maximum operation.

According to the second aspect of the invention, in addition to achieving the benefits as described above of a control method according to the first aspect of the invention, also controls brake torque using as desired total brake torque (Tq) of the vehicle the sum of brake torque (Tb) corresponding to operational state of a brake operator, and second engine brake equivalent torque (Ta2), which is equivalent to the engine brake torque at the start of brake operator operation, when brake operator operation starts in the vehicle speed range below the specific speed V1 and brake operator operation amount (Sb) is increasing. It is therefore possible even in the vehicle speed range below the specific speed V1 to prevent a drop in vehicle deceleration not in accordance with the driver's intention, and apply total brake torque to the vehicle corresponding to the braking as intended by the driver.

Furthermore, when brake operator operation amount (Sb) decreases, brake torque is controlled using as the desired total brake torque (Tq) the sum of brake torque (Tb) corresponding to operational state of a brake operator, and torque (Ta"), which is calculated to approach brake torque (Ta) corresponding to operational state of an accelerator operator from second engine brake equivalent torque (Ta2) in accordance with the reduction ratio in brake operator operation amount (Sb) from a maximum operation limit. It is therefore possible in this case, too, to faithfully brake as intended by the driver, and achieve relatively natural vehicle deceleration and stopping.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
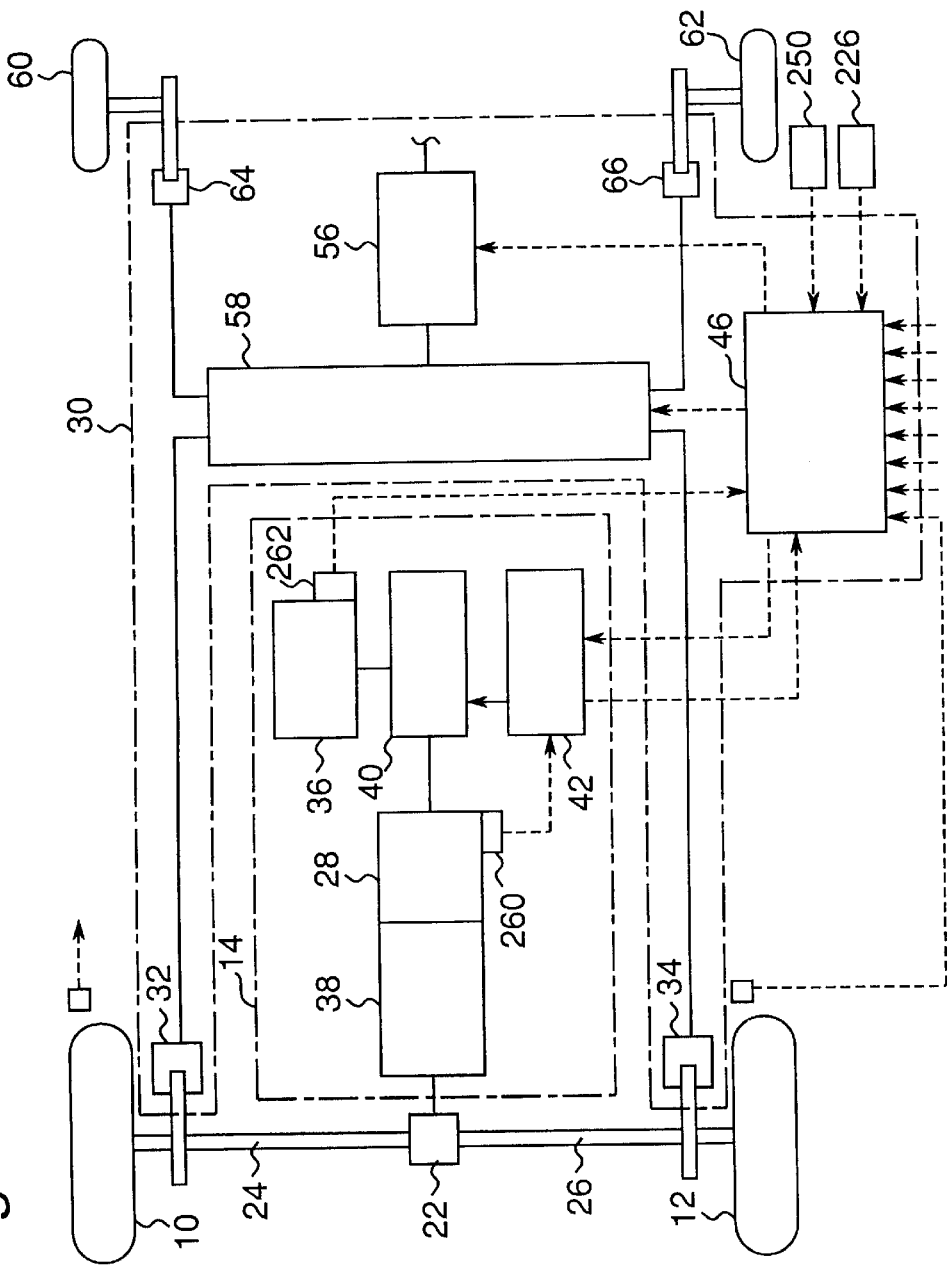
FIG. 1 is a schematic block diagram showing the major components of a brake system in a vehicle equipped with a vehicle brake system according to a preferred embodiment of the invention.
Figure 2:
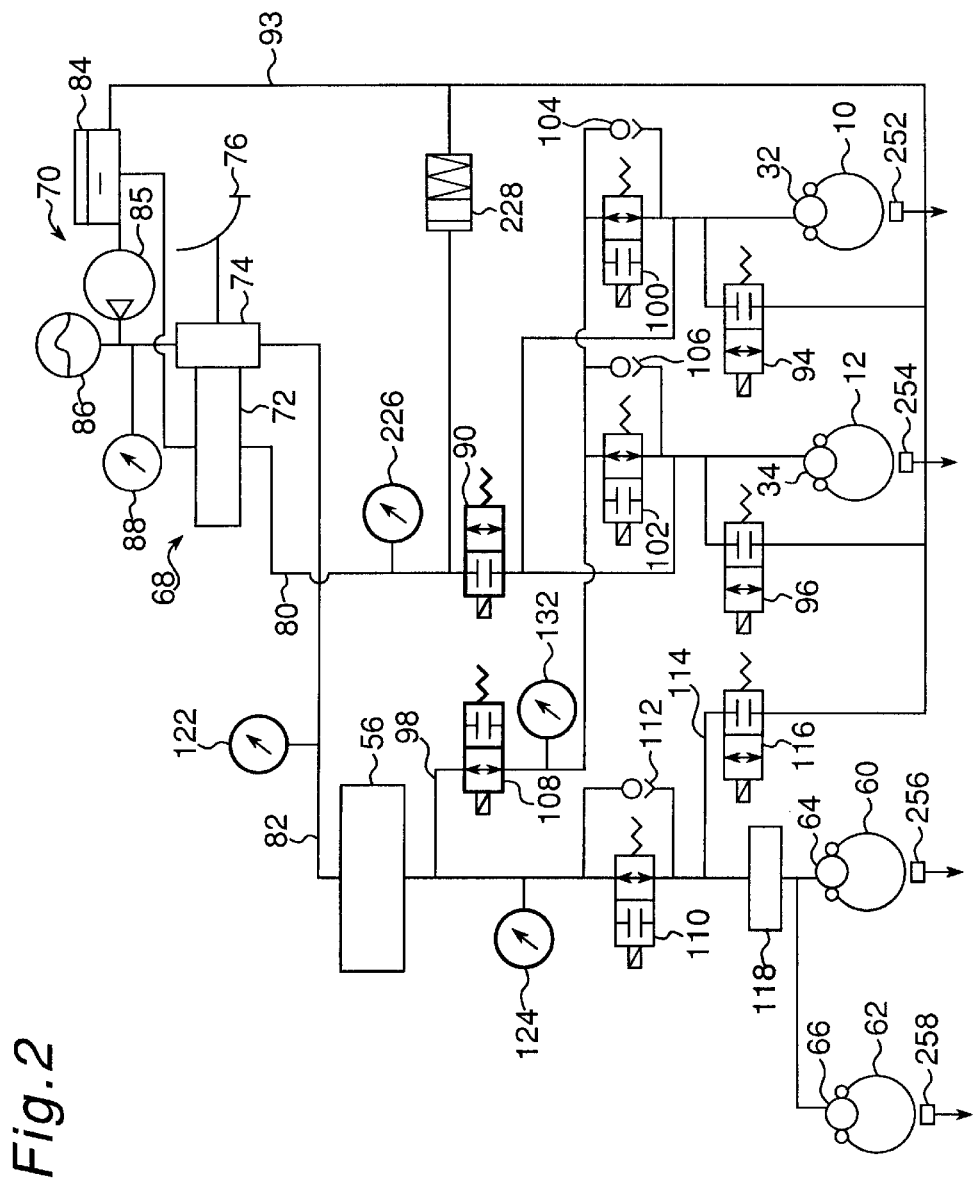
FIG. 2 is a schematic diagram showing major components of a hydraulic brake system that is part of the vehicle brake system shown in FIG. 1.

A preferred embodiment of the invention is described below with reference to the accompanying figures. FIG. 1 is a schematic block diagram showing the major components of a brake system in a vehicle equipped with a vehicle brake system according to a preferred embodiment of the invention. FIG. 2 is a schematic diagram showing major components of a hydraulic brake system that is part of the vehicle brake system shown in FIG. 1.

As shown in FIG. 1, a vehicle having a brake system of the invention is in this preferred embodiment a so-called hybrid vehicle, that is, a vehicle driven using both drive power generated by an internal combustion engine and an electric motor. Front wheels 10 and 12, which are the drive wheels in this vehicle, are driven by electric drive unit 14 and an internal combustion engine (not shown in the figure). Electric drive unit 14 is connected to front drive wheels 10 and 12 by way of intervening differential 22 and right and left drive shafts 24 and 26. It should be further noted that electric drive unit 14 also operates as a regenerative brake unit for applying regenerative brake torque to front wheels 10 and 12 as a result of regenerative braking by electric motor 28.

A hydraulic brake system 30 for use as a friction brake system in conjunction with the regenerative brake unit 14 is also provided in the vehicle brake system of this preferred embodiment. As will be further described in detail below, hydraulic pressure is transferred to the wheel cylinders 32, 34, 64, 66 of this hydraulic brake system 30, causing a friction material (not shown in the figure) to frictionally engage a rotating body (not shown in the figure) that rotates integrally with each wheel 10, 12, 60, 62, and thereby apply hydraulic brake torque to the wheels 10, 12, 60, 62.

When braking this vehicle, regenerative brake torque produced by regenerative brake unit 14 and hydraulic brake torque produced by hydraulic brake system 30 are applied to front wheels 10 and 12, and hydraulic brake torque produced by hydraulic brake system 30 is applied to rear wheels 60 and 62, and the vehicle is braked by the total brake torque, that is, the sum of the brake torque applied to front and rear wheels.

In addition to electric motor 28, regenerative brake unit 14 has a battery unit 36, transmission 38, power converter 40, and electric motor controller 42. If battery unit 36 is charged by the electromotive force (regenerative electromotive force) produced in electric motor 28 when the shaft of electric motor 28 is forcibly rotated in conjunction with rotation of wheels 10 and 12, electric motor 28 operates as a load on the rotational motion of wheels 10 and 12. In other words, regenerative brake torque is produced working against rotation of wheels 10 and 12.

Direct current stored in battery unit 36 is converted to alternating current by power converter 40 and supplied to electric motor 28. While not specifically shown in the figures, power converter 40 has an inverter, and is controlled by a control signal from electric motor controller 42. The amount of brake torque and drive torque produced by electric motor 28 is controlled by controlling the inverter frequency using, for example, slip-frequency control or vector control. As a result, the regenerative brake torque or drive torque. applied to the wheels is also controlled.

The drive torque is controlled according to such conditions as depression of the accelerator pedal (not shown in the figure) by the driver. It should be particularly noted that torque can be controlled when the driver lets up on or completely releases the accelerator (so that there is zero pedal depression) while driving to brake the vehicle by producing regenerative brake torque comparable to the engine brake applied in a conventional engine-powered vehicle. How brake torque is set comparably to an engine brake is described in further detailed below.

In addition to the wheel cylinders 32, 34, 64, 66 disposed to wheels 10, 12, 60, 62, respectively, total brake torque controller 46, linear valve unit 56, and antilock brake control unit 58, hydraulic brake system 30 has a hydraulic circuit as shown in FIG. 2.

It should be noted that total brake torque controller 46 controls the hydraulic brake torque as the friction brake torque, and controls the total brake torque, which is basically the sum of the hydraulic brake torque and regenerative brake torque. How total brake torque controller 46 operates for torque control is further described below.

The hydraulic circuit shown in FIG. 2 interconnects the master cylinder 68 linked to brake pedal 76 with the wheel cylinders 32, 34, 64, 66 disposed at the wheels 10, 12, 60, 62, and the basic configuration and operation thereof is substantially the same as any conventional hydraulic brake circuit. That is, hydraulic pressure produced by master cylinder 68 in accordance with the driver's operation of the brakes (that is, basically in accordance with depression of the brake pedal 76 by the driver) is appropriately controlled by a control valve in the hydraulic circuit and transferred to the wheel cylinders 32, 34, 64, 66 of the respective wheels 10, 12, 60, 62.

The master cylinder 68 has two pressure chambers 72, 74. When the driver depresses the brake pedal 76, substantially the same amount of hydraulic pressure is produced in each pressure chamber 72, 74 with the hydraulic pressure determined by brake pedal 76 depression. One pressure chamber 72 is connected to the wheel cylinders 32, 34 of the front drive wheels 10, 12 by intervening brake line 80, and the other chamber 74 is connected to the wheel cylinders 64, 66 of the rear wheels 60 and 62 by intervening brake line 82.

Hydraulic circuit high pressure source 70 has a master reservoir 84, pump 85, and accumulator 86. Working fluid ("brake fluid" below) is pumped from master reservoir 84 by pump 85 and stored in accumulator 86. A pressure sensor 88 disposed in the hydraulic line from accumulator 86 to pressure chamber 74 detects when the pressure in accumulator 86 equals or exceeds a maximum pressure level, also the pressure sensor 88 detects when the pressure in accumulator 86 equals or less than a minimum pressure level. Pump 85 pumps and stops according to the pressure detected by pressure sensor 88 so that brake fluid at the hydraulic pressure within a specific pressure range is always stored in accumulator 86.

Because the high pressure source 70 is connected to pressure chamber 74 of master cylinder 68, brake fluid from high pressure source 70 is supplied to pressure chamber 74 when brake pedal 76 is depressed. This makes it possible to moderate the brake pedal 76 stroke.

A solenoid valve 90 is disposed intervening in the brake line 80 from the one pressure chamber 72 of master cylinder 68 to the wheel cylinders 32, 34 of front drive wheels 10, 12. The connection between wheel cylinders 32, 34 and master cylinder 68 can be opened and closed by opening and closing solenoid valve 90. The solenoid valve 90 is controlled to close the line between wheel cylinders 32, 34 and master cylinder 68 during antilock brake control and when regenerative brake torque control and friction brake torque control are used together (that is, during coordinated regenerative braking control).

Solenoid valves 94 and 96 are disposed as pressure reducing valves in brake line 93 connecting master reservoir 84 and front wheel cylinders 32, 34. When these solenoid valves 94 and 96 open, wheel cylinders 32, 34 communicate with master reservoir 84, the pressure in wheel cylinders 32, 34 drops, and the hydraulic brake torque drops.

Solenoid valves 100, 102 are further disposed as pressure boosters in brake line 98 connecting linear valve unit 56 and front wheel cylinders 32, 34. These solenoid valves 100, 102 are normally open when coordinated regenerative braking control is used during normal braking situations, and thus enable wheel cylinders 32, 34 to communicate with linear valve unit 56.

Backflow prevention valves 104, 106 are disposed in the bypass lines for solenoid valves 100, 102. These backflow prevention valves 104, 106 allow brake fluid to flow from wheel cylinders 32, 34 to linear valve unit 56, but prevent fluid from flowing in the opposite direction. These backflow prevention valves 104, 106 thus assure that the brake fluid flows quickly back to wheel cylinders 32, 34 when the brake pedal 76 is released. Solenoid valve 108 is disposed between solenoid valves 100, 102 and linear valve unit 56 in brake line 98. This solenoid valve 108 is set to remain open during coordinated regenerative braking control and when antilock brake control is applied to front wheels 10 and 12.

Linear valve unit 56 is disposed intervening in the brake line 82 between pressure chamber 74 of master cylinder 68 and wheel cylinders 64, 66 of rear wheels 60 and 62, and brake line 98 is connected to brake line 82 on the wheel cylinder side of linear valve unit 56. Solenoid valve 110 is further disposed as a pressure booster between linear valve unit 56 and wheel cylinders 64, 66. Backflow prevention valve 112 is disposed in the bypass line for solenoid valve 110. This backflow prevention valve 112 allow brake fluid to flow from wheel cylinders 64, 66 to linear valve unit 56, but prevent fluid from flowing in the opposite direction.

Solenoid valve 116 is disposed as a pressure reducing valve in brake line 114, which connects wheel cylinders 64, 66 and master reservoir 84. A proportioning valve 118 disposed in brake line 82 controls the hydraulic pressure so that the pressure in wheel cylinders 64, 66 of the rear wheels 60 and 62 does not become greater than the hydraulic pressure in wheel cylinders 32, 34 for the front wheels 10 and 12. It should be noted that in this preferred embodiment the hydraulic pressure of wheel cylinder 64 for rear wheel 60, and the hydraulic pressure of wheel cylinder 66 for rear wheel 62, are controlled together.

A hydraulic pressure sensor 122 is also disposed in brake line 82 between linear valve unit 56 and master cylinder 68, and a hydraulic pressure sensor 124 is further disposed to brake line 82 on the wheel cylinder side of linear valve unit 56. A further hydraulic pressure sensor 132 is also provided on brake line 98. This hydraulic pressure sensor 132 is provided to detect failure of hydraulic pressure sensor 124. When solenoid valve 108 is held open and the output signal from hydraulic pressure sensor 132 and the output signal of hydraulic pressure sensor 124 differ by more than a specific amount, hydraulic pressure sensor 124 can be determined to have failed.

Furthermore, linear valve unit 56 adjusts the pressure from pressure chamber 74 so that the pressure detected by hydraulic pressure sensor 124 to be a specific value determined by the hydraulic pressure brake torque to be achieved (the target hydraulic pressure brake torque), and then, supplies the hydraulic pressure to the wheel cylinder.

A further hydraulic pressure sensor 226 for detecting the hydraulic pressure of master cylinder 68 (more specifically, the hydraulic pressure of pressure chamber 72) is further disposed to brake line 80. Because the hydraulic pressure of master cylinder 68 is determined by the driver's operation of the brake pedal 76, the brake torque corresponding to this pressure can be treated as the brake torque desired by the driver, and can therefore be further used as the desired total brake torque for brake torque control. A so-called stroke simulator 228 is further disposed to brake line 80 to avoid the brake pedal 76 stroke going to substantially zero (0) when solenoid valve 90 is closed.

Wheel speed sensors 252, 254, 256, 258 for detecting the rotational velocity of wheels 10, 12, 60, 62, respectively, are further disposed. Data relating to brake slippage, the estimated vehicle speed, and other brake control parameters can be obtained from the output signals of wheel speed sensors 252, 254, 256, 258.

When the driver operates the brakes, the desired total brake torque is basically determined according to the output signal from hydraulic pressure sensor 226, which detects the hydraulic pressure of pressure chamber 72 in master cylinder 68. As noted above, the hydraulic pressure of master cylinder 68 corresponds to the force with which the driver depresses brake pedal 76, and the brake torque developed at this hydraulic pressure can be used as the required brake torque intended by the driver, that is, as the desired total brake torque.

It should be noted that determining this desired total brake torque shall not be limited to the depression force of brake pedal 76, and could alternatively be determined based on other brake operating conditions, such as the stroke length or duration the brake pedal is operated.

The desired regenerative brake torque is determined by the lower of either a maximum design limit, which is determined according to the system design parameters, or a maximum operation limit, which is determined according to brake operating parameters. The maximum design limit is, more specifically, the maximum regenerative brake torque, which is determined based on such system design parameters as the capacity of electric motor 28, which functions as the generator, and the charge capacity (maximum charge capacity) of battery unit 36. The maximum operation limit is the maximum brake torque determined according to such operating conditions as the driver's operation of brake pedal 76 and operation of the accelerator pedal (not shown in the figure). Note that this maximum operation limit corresponds to the desired total brake torque.

The total brake torque controller 46 and electric motor controller 42 consist primarily of a microcomputer equipped with ROM, RAM, and PU (a processing unit).

The above-noted hydraulic pressure sensors 122, 124, and 226, and charge capacity detector 262 for detecting the charge capacity of battery unit 36, are electrically connected to the input section of total brake torque controller 46, and the solenoids of the various solenoid valves 90, 94, 96, 100, 102, 108, 110, and 116, and linear valve unit 56, are electrically connected through an intervening drive circuit (not shown in the figure) to the output section of total brake torque controller 46. Control programs such as a coordinated brake torque control determination program for determining based on the charge capacity of battery unit 36 whether to apply coordinated control of the hydraulic brake torque and regenerative brake torque, and a coordinated control program for performing coordinated control, are stored to the ROM of total brake torque controller 46.

An encoder 260 for detecting the rotational speed of electric motor 28, and an accelerator pedal operation detector for detecting operational state of the accelerator pedal (not shown in the figure), are connected to the input section of electric motor controller 42, and power converter 40 is electrically connected to the output section. Control programs such as a drive torque control program and a regenerative brake torque control program are stored to the ROM of electric motor controller 42.

Power converter 40 is controlled to achieve drive torque in accordance with operational state of the accelerator pedal (not shown in the figure), or to achieve regenerative brake torque substantially equal to the target regenerative brake torque, based on a control signal from electric motor controller 42.

When brake pedal 76 is depressed in a vehicle brake system thus comprised, a total brake torque including at least one of hydraulic brake torque and regenerative brake torque is applied to each wheel 10, 12, 60, 62. Furthermore, while both hydraulic brake torque and regenerative brake torque can be applied to the front wheels 10 and 12, which are the drive wheels as noted above, according to the driver's operation of the brakes, only hydraulic brake torque, and not regenerative brake torque, is applied to the rear wheels 60 and 62, which are not drive wheels.

It should be further noted that while the system in FIG. 2 is shown as exemplary of a brake pressure generating system and brake pressure adjusting system, the configuration thereof shall not be limited to that shown in FIG. 2. It will be obvious, for example, that the same coordinated regenerative torque control can be achieved insofar as the system is configured with the ability to adjust the hydraulic pressure applied to the wheel cylinders.

Various information is exchanged between electric motor controller 42 and total brake torque controller 46.

In this preferred embodiment of the invention, total brake torque controller 46 supplies to electric motor controller 42 information (a signal) indicative of a control flag (1 when control is applied, 0 when not applied) during coordinated brake torque control (that is, coordinated control of regenerative brake torque and hydraulic brake torque), and information (a signal) indicative of the target regenerative brake torque. The value of this target regenerative brake torque is zero (0) when coordinated control of the brake torque is not applied ("non-coordinated control" below).

Electric motor controller 42 supplies to total brake torque controller 46 information (a signal) indicative of the maximum regenerative brake torque (that is, the smaller of the above-noted maximum operation limit and maximum design limit), and information (a signal) indicative of the actual regenerative brake torque. This actual regenerative brake torque is zero (0) during non-coordinated control.

The start of brake torque control is triggered when hydraulic pressure sensor 226 detects that pressure has been produced in master cylinder 68 (or more specifically in pressure chamber 72), and the control flag is set to 1. Brake torque control ends, and the control flag is set to 0, when any of various ending conditions are satisfied, including the vehicle coming to a stop, a problem occurring in total brake torque controller 46 or other components, or the charge capacity of battery unit 36 going to zero.

The vehicle is determined to being at a stop when, for example, the wheel speed of either front drive wheel 10, 12, or more specifically the wheel speed detected by either wheel speed sensor 252 or 254, is below a specific set speed. It will also be obvious that other conditions can be used for determining if the vehicle is stopped, including detecting if the estimated vehicle speed obtained from the wheel speed of the wheels 10, 12, 60, 62 is less than a set speed, or by reading a vehicle speed sensor to detect if the vehicle speed is less than a set speed.

A control method for a coordinated regenerative brake system according to this preferred embodiment of the invention is described next below.

As noted above, regenerative brake torque comparable to the so-called engine brake that is applied in a conventional engine-powered vehicle can be applied to the wheels when the driver lets up on or completely releases the accelerator pedal (so that there is zero pedal depression) while driving. In this embodiment as shown in the graph in FIG. 3, however, brake torque Ta comparable to the engine brake that should act on the vehicle when accelerator pedal depression is effectively zero (0) is set to gradually go to zero (0) in accordance with vehicle speed V in a vehicle speed range less than or equal to a specific speed V1, which is set to a relatively low speed range.

Figure 3:
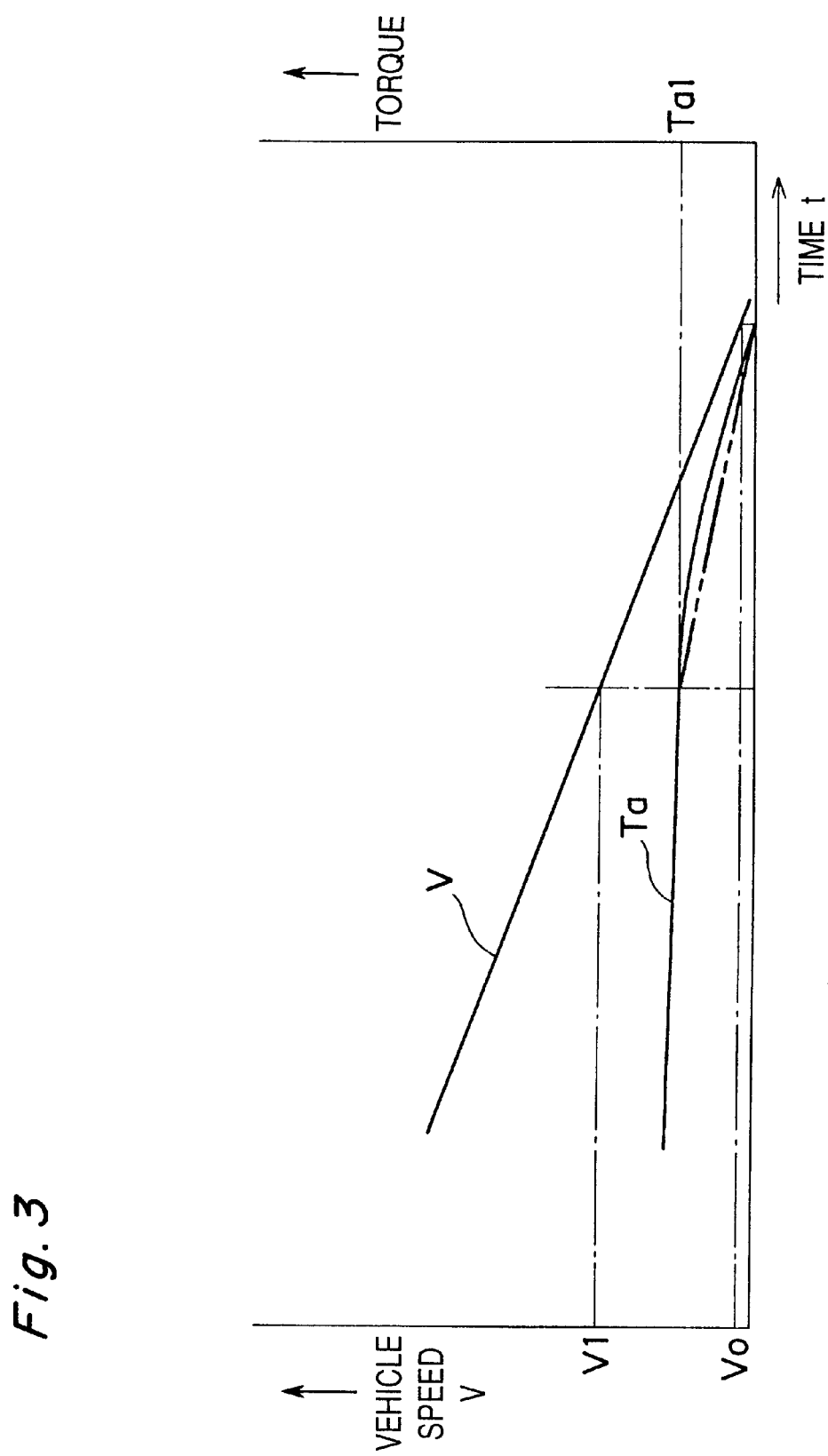
FIG. 3 is a graph of the engine brake equivalent torque setting in a vehicle speed range equal to or below a specific value.

In other words, referring to FIG. 3, when there is zero accelerator pedal depression, brake torque Ta equivalent to an engine brake applied to the vehicle (referred to below as engine brake equivalent torque Ta) is substantially constant when vehicle speed V exceeds specific speed V1. However, when vehicle speed V reaches specific speed V1, which is set to a relatively low speed (about 20 km/h, for example) as noted above, brake torque Ta is set to drop gradually along the solid line curve in FIG. 3, for example, from engine brake equivalent torque Ta1 at that time to zero in accordance with vehicle speed V. It should be further noted that when engine brake equivalent torque Ta reaches zero, vehicle speed Vo corresponds substantially to the idling engine rotational speed of a conventional engine-powered vehicle.

Figure 7:
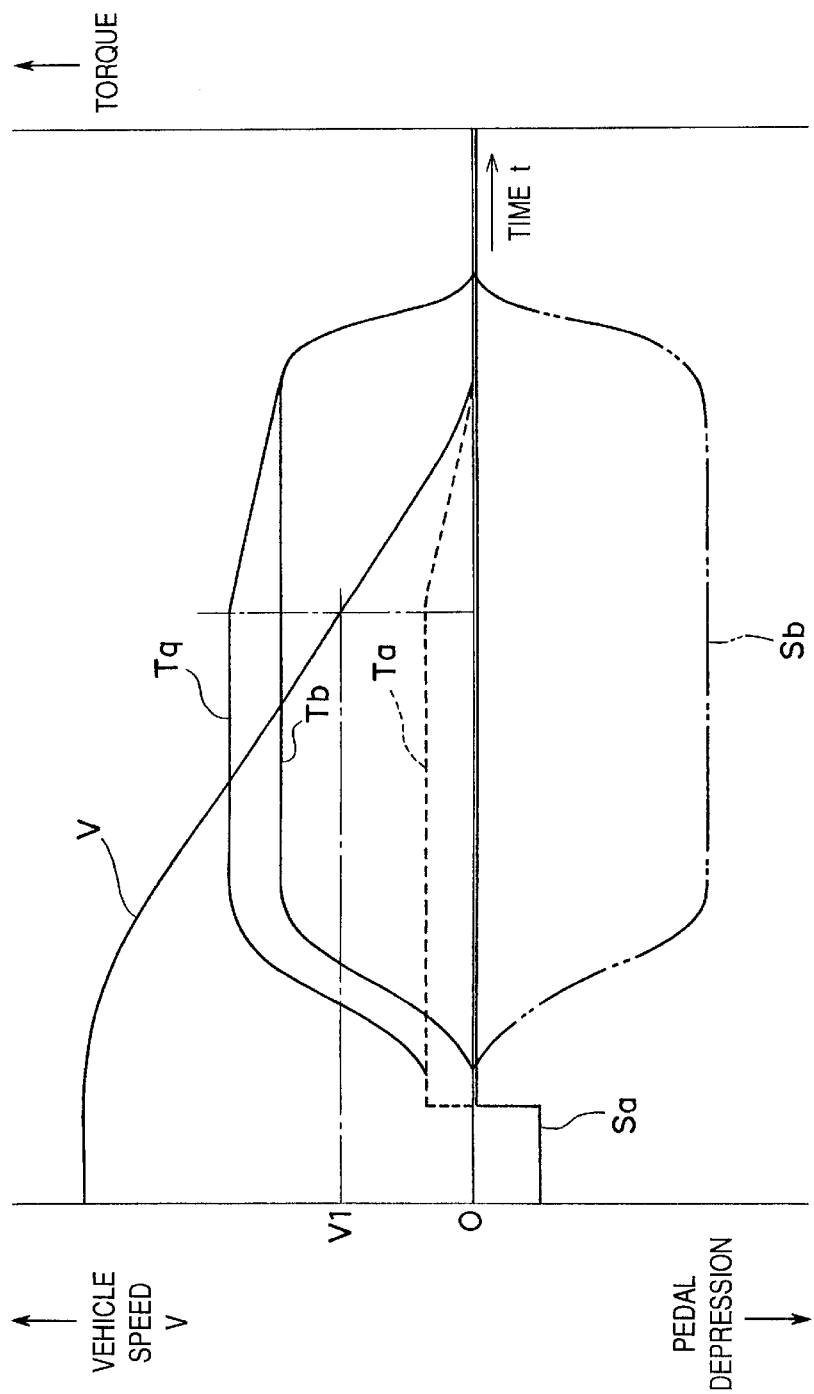
FIG. 7 is a graph of an exemplary engine brake equivalent torque setting in the vehicle speed range below or equal to the specific value.

Setting engine brake equivalent torque Ta to decline gradually in a vehicle speed range equal to or below a specific speed V1 in this case is the same as the case shown in FIG. 7 (see dotted line Ta in FIG. 7). It should be noted that controlling engine brake equivalent torque Ta in this way resolves problems presented by regenerative brake systems according to the related art, such as it being difficult to control braking to stop at a specific point as a result of a constant brake torque (engine brake equivalent torque) working until just before the vehicle stops, the sudden loss of vehicle deceleration when regenerative brake torque (engine brake equivalent torque) goes suddenly to zero at the regeneration limit speed immediately before the vehicle stops, and thus enables relatively natural deceleration and stopping with characteristics comparable to those of a conventional engine-powered vehicle.

It will be obvious that the pattern of the gradual decrease in engine brake equivalent torque Ta to zero shall not be limited to the above noted curve. For example, there can be a gradual linear decrease in engine brake equivalent torque Ta as indicated by the double-dot dash line in FIG. 3. In addition, a gradual decreasing pattern weighted by a specific weighting coefficient in accordance with vehicle speed, for example, could also be used.

It should thus be noted that the engine brake equivalent torque Ta can decrease gradually to zero following various patterns in the vehicle speed range below specific speed V1. More specifically, any pattern can be used insofar as this torque Ta decreases gradually to zero (0) from engine brake equivalent torque Ta1 appropriate to specific vehicle speed V1 (referred to below as first engine brake equivalent torque) in accordance with the drop in vehicle speed, and the pattern best suited to the required brake torque characteristics of the vehicle is desirably selected.

In this embodiment of the invention, the coordinated regenerative brake system is controlled so that after the driver lets up on or completely releases the accelerator pedal while in motion (that is, while engine brake equivalent torque is applied), and the driver further depresses the brake pedal in accordance with a particular braking intent, brake force as demanded by the driver's operation of the brake pedal is applied to the vehicle.

This is further described below with reference to FIG. 4 and FIG. 5 assuming that brake pedal 76 operation starts in the vehicle speed range exceeding specific speed V1.

Figure 4:
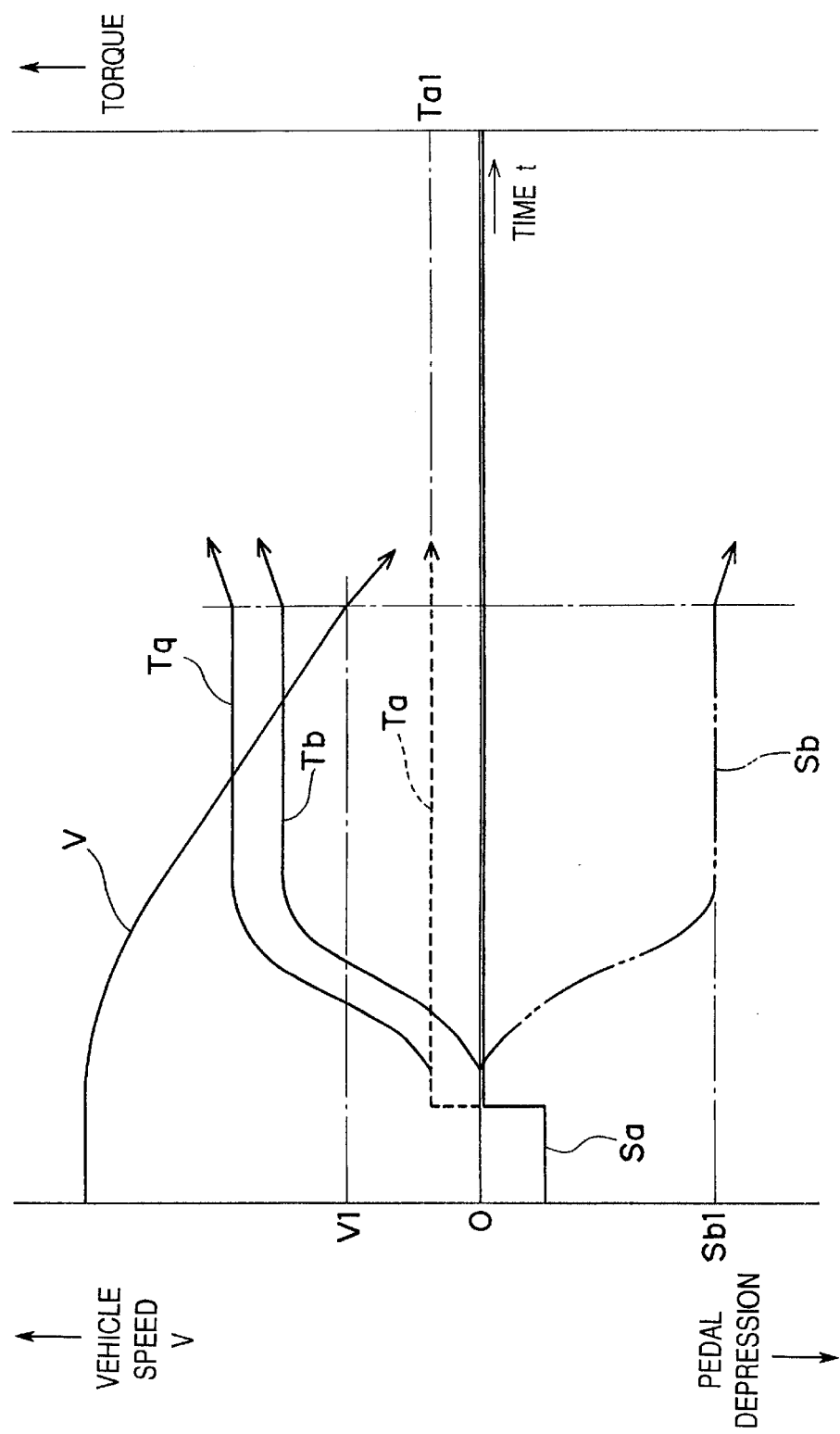
FIG. 4 is a graph used to describe total brake torque control when the brake pedal is depressed in a vehicle speed range exceeding the specific value and brake pedal depression then increases.
Figure 5:
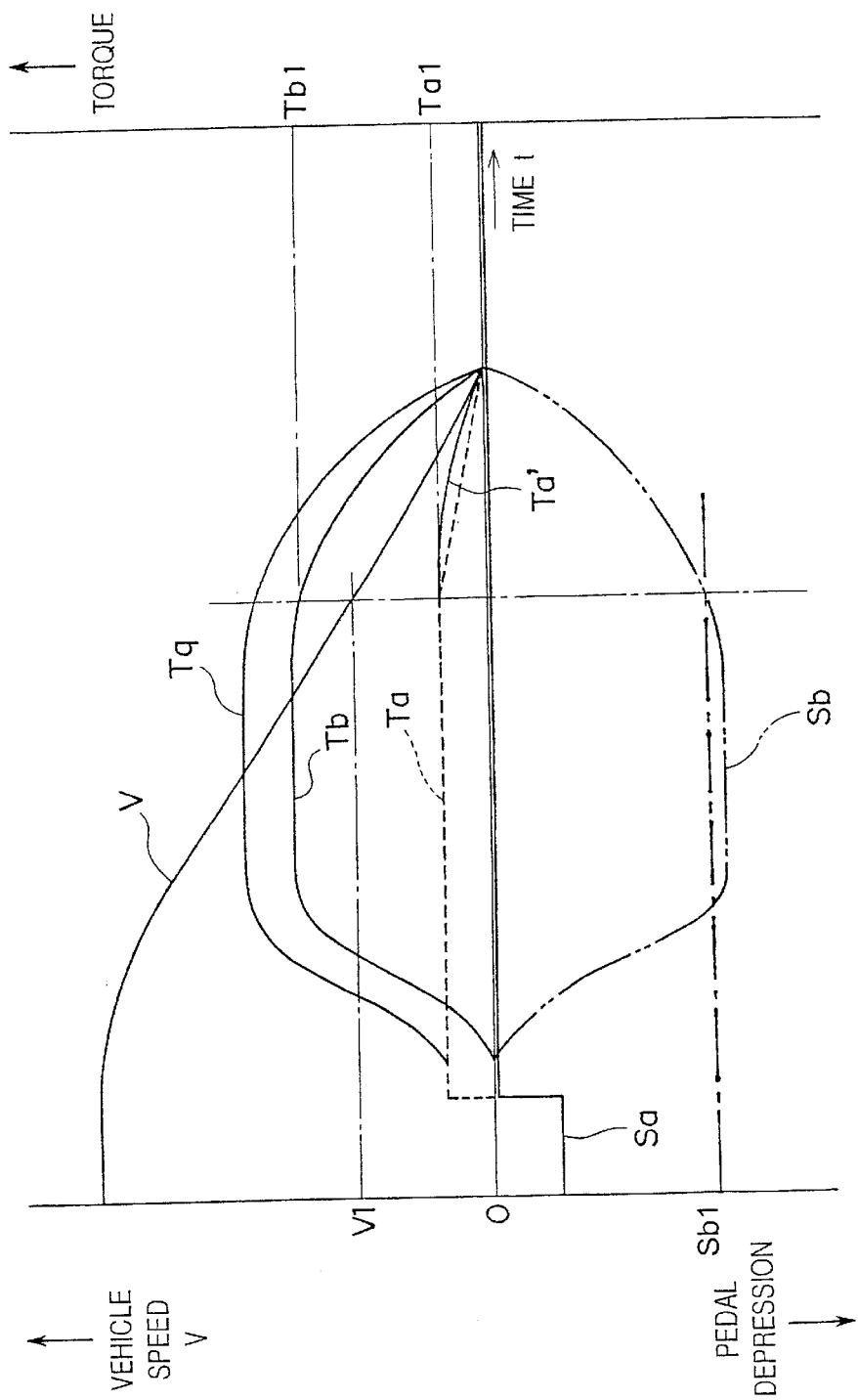
FIG. 5 is a graph used to describe total brake torque control when the brake pedal is depressed in a vehicle speed range exceeding the specific value and brake pedal depression then decreases.

As shown in the graphs in FIG. 4 and FIG. 5, the sum of brake torque Tb corresponding to brake pedal operational state (depression), and brake torque corresponding to accelerator pedal operational state (that is, engine brake equivalent torque Ta), is controlled as the desired total brake torque Tq of the vehicle. This control is the same as the case shown in FIG. 7, and torque can be obtained using the following equation.

$$Tq = Tb + Ta \quad (1)$$

where $V \geq V1$.

Total brake torque corresponding to brake pedal depression (that is, corresponding to the braking intent of the driver) can thus be achieved as usual when brake pedal 76 operation starts in the vehicle speed range exceeding specific speed V1 because brake torque is controlled using the sum of engine brake equivalent torque Ta and brake torque Tb corresponding to brake pedal depression as the desired total brake torque Tq in the vehicle speed range exceeding specific speed V1.

However, when vehicle speed V reaches this specific speed V1 and thus enters the vehicle speed range of V1 or slower, the brake torque control pattern splits in two according to brake pedal depression Sb1 (referred to below as first brake operation amount) at the time vehicle speed V reaches V1.

That is, as shown in FIG. 4, when brake pedal depression Sb is equal to or greater than first brake operation amount Sb1, desired total brake torque Tq is controlled using the sum of brake torque Tb corresponding to brake pedal depression and engine brake equivalent torque Ta1 (first engine brake equivalent torque) when vehicle speed V reaches V1. Brake torque can be obtained using the following equation in this case.

$$Tq = Tb + Ta1 \quad (2)$$

where $V < V1$ and $Sb \geq Sb1$.

In this case, therefore, a drop in vehicle deceleration not in accordance with the driver's intention can be prevented even in the vehicle speed range below specific speed V1, and total brake torque can be applied to the vehicle as desired by the driver.

However, if brake pedal depression Sb is less than first brake operation amount Sb1 as shown in FIG. 5, torque Ta' (referred to below as first gradual change torque Ta') is calculated according to the rate of decrease in brake pedal depression Sb. Note that this first gradual change torque Ta' is a torque brought gradually close to engine brake equivalent torque Ta from first engine brake equivalent torque Ta1.

The equation used for this calculation is defined by the desired approach from first engine brake equivalent torque Ta1 to engine brake equivalent torque Ta, and the gradual reduction pattern of engine brake equivalent torque Ta to zero in the vehicle speed range below specific value V1.

This can be achieved with linear approximation, for example, using the following equation.

$$Ta' = [(Ta1 - Ta)/Tb1] \times Tb + Ta \quad (3)$$

where Tb1 is brake torque corresponding to brake pedal depression (that is, first brake operation amount Sb1) when vehicle speed V reaches specific speed V1.

Brake torque is then controlled using the sum of brake torque Tb corresponding to brake pedal depression and this first gradual change torque Ta' as desired total brake torque Tq. The torque equation in this case is $$Tq = Tb + Ta' \quad (4)$$

where $V < V1$ and $Sb < Sb1$.

Since brake torque is controlled using the sum of brake torque Tb corresponding to brake pedal depression and first gradual change torque Ta', which is calculated to approach brake torque Ta corresponding to accelerator pedal operation state from first engine brake equivalent torque Ta1 according to the reduction ratio of brake pedal depression Sb, as desired total brake torque Tq when brake pedal depression Sb is less than first brake operation amount Sb1, relatively natural vehicle deceleration and stopping can be achieved while faithfully applying the brakes as intended by the driver even when engine brake equivalent torque Ta is set higher than the engine brake torque of a conventional engine-powered vehicle.

Figure 6:
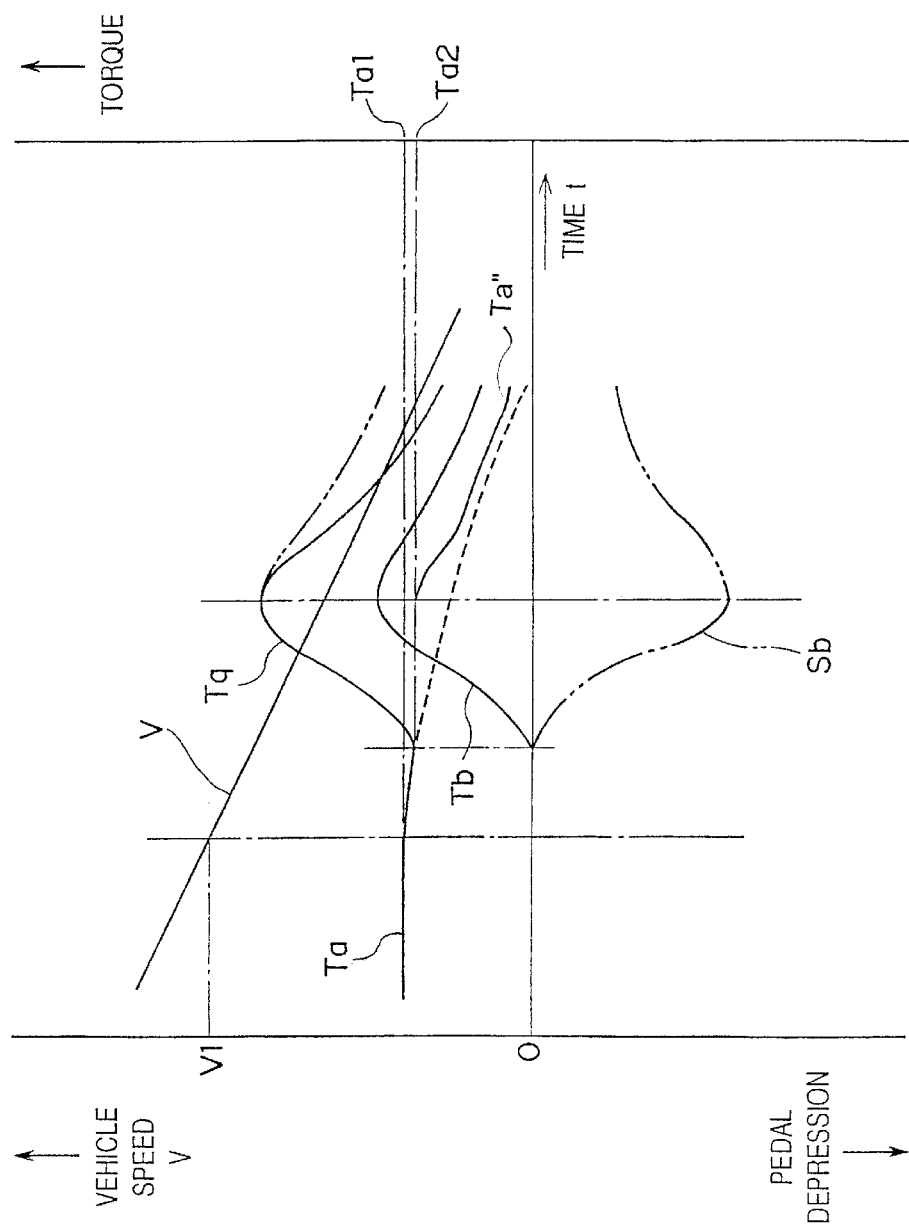
FIG. 6 is a graph used to describe total brake torque control when the brake pedal is depressed in a vehicle speed range below or equal to the specific value.

Control when operating the brake pedal 76 starts in the vehicle speed range below specific speed V1 is explained next with reference to FIG. 6. Two control patterns are used in this case according to whether brake pedal depression is tending to increase or decrease.

That is, if brake pedal depression Sb is increasing, brake torque is controlled using the sum of brake torque Tb corresponding to brake pedal depression, and engine brake equivalent torque Ta2 when brake pedal 76 operation begins (referred to as second engine brake equivalent torque Ta2 below), as desired total brake torque Tq. The torque equation in this case is $$Tq=Tb+Ta2 \quad (5)$$

where V<V1 and d(Sb)/dt≧0.

In this case, therefore, a drop in vehicle deceleration not in accordance with the driver's intention can be prevented, and total brake torque can be applied to the vehicle as desired by the driver.

However, if brake pedal depression Sb starts to decrease beyond the relative maximum, a second gradual change torque Ta" is calculated according to the rate of decrease in brake pedal depression Sb. Note that this second gradual change torque Ta" is a torque brought gradually close to engine brake equivalent torque Ta from second engine brake equivalent torque Ta2.

The equation used for this calculation is defined by the desired approach from second engine brake equivalent torque Ta2 to engine brake equivalent torque Ta, and the gradual reduction pattern of engine brake equivalent torque Ta to zero in the vehicle speed range below specific value V1. While the specific numeric values will differ, the same method used to calculate first gradual change torque Ta' above can be used to calculated second gradual change torque Ta".

Brake torque control is then applied using the sum of brake torque Tb corresponding to brake pedal depression and this second gradual change torque Ta" as desired total brake torque Tq. The torque equation in this case is $$Tq=Tb+Ta'' \quad (6)$$

where V<V1 and d(Sb)/dt<0.

Relatively natural vehicle deceleration and stopping can thus be achieved while faithfully applying the brakes as intended by the driver when brake pedal depression Sb begins to decrease more than the relative maximum because brake torque control is accomplished using as desired total brake torque Tq the sum of brake torque Tb corresponding to brake pedal depression and second gradual change torque Ta", which is calculated to gradually approach engine brake equivalent torque Ta from second engine brake equivalent torque Ta2 according to the rate of decrease in brake pedal depression Sb from the relative maximum.

As described above, according to the embodiment of the invention, by controlling brake torque Ta, which is equivalent to the engine brake torque in a conventional vehicle, so that it gradually goes to zero in accordance with the drop in vehicle speed V, problems presented by the related art can be improved, and relatively natural deceleration and stopping comparable to a conventional engine-powered vehicle can be achieved. As noted above, these problems include difficulty operating the brakes to stop at a particular point when a constant brake torque equivalent to engine brake torque continues working until immediately before the vehicle stops, and a sudden loss of deceleration when regenerative brake torque (equivalent to engine brake torque) goes suddenly to zero at the regeneration limit speed immediately before the vehicle stops.

It is also possible, when brake pedal 76 is operated while brake torque Ta equivalent to engine brake torque is applied, to achieve desired total brake torque appropriate to the timing of brake pedal operation (that is, whether the brake pedal is applied when the vehicle speed is in the range exceeding a specific speed V1 or in the range equal to or below specific speed V1), and appropriate to brake operational state at the time vehicle speed reached this specific speed V1. As a result, relatively natural vehicle deceleration and stopping can be achieved in both of these cases while faithfully applying the brakes as intended by the driver.

It will also be obvious that while the total brake torque controller 46, which operates as the main part of the friction brake torque control mechanism, and electric motor controller 42, which operates as the main part of the regenerative brake torque control mechanism, consist primarily of a microcomputer having ROM, RAM, and PU (a processing unit) in this embodiment of the invention, and coordinated regenerative control is achieved with data communication between these two controllers, applications of the invention shall not be limited to systems so comprised.

For example, the microcomputer or other main control parts could be separated from the friction brake torque control unit and regenerative brake torque control unit and incorporated into a single controller that is built in to the system. An advantage of such a design is that it eliminates the need for a communication line between CPUs. Alternatively, coordinated regenerative control could be processed in a single software program. It will also be obvious that such a control unit can be placed anywhere in the system.

The friction brake torque control unit in this preferred embodiment comprises total brake torque controller 46 and linear valve unit 56, and the regenerative brake torque control unit comprises electric motor controller 42 and power converter 40. In addition, friction brake torque is produced by a hydraulic brake system of which the major component is a hydraulic circuit, but other types of friction brake mechanisms can be alternatively used to the same effect.

Yet further, while an accelerator pedal and brake pedal are used as the accelerator operator and brake operator in the above embodiment, the invention shall not be so limited and other means capable of operating the vehicle accelerator and brakes can be employed.

It will thus be obvious that the present invention can be modified in various ways that will be apparent to one with ordinary skill in the related art, and such variations are included in the scope of the accompanying claims.

What is claimed is:

1. A method of controlling a coordinated regenerative brake system of a vehicle by coordinating a friction brake torque and a regenerative brake torque for a desired brake torque (Tq), the friction brake torque comprising a brake operation brake torque (Tb) responsive to a brake operation amount (Sb), and the regenerative brake torque comprising an accelerator operation brake torque (Ta) responsive to an accelerator operation amount (Sa), the method comprising:

when a speed of the vehicle (V) is less than or equal to a first predetermined vehicle speed (V1), and when the accelerator operation amount (Sa) is effectively zero and no brake operation amount (Sb) is made, controlling the desired brake torque (Tq) using the accelerator operation brake torque (Ta) to gradually approach zero in accordance with the vehicle speed (V), the accelerator operation brake torque (Ta) being equivalent to an engine brake torque working on the vehicle; and when the vehicle speed (V) is greater than the first predetermined vehicle speed (V1) when a brake operation begins, controlling the desired brake torque (Tq):
using a sum of the brake operation brake torque (Tb) and the accelerator operation brake torque (Ta) when the vehicle speed exceeds the predetermined vehicle speed (V1);
using a sum of the brake operation brake torque (Tb) and a first accelerator operation brake torque (Ta1), which is equivalent to the engine brake torque at the first predetermined vehicle speed (V1), when the vehicle speed (V) is less than or equal to the first predetermined vehicle speed (V1) and a brake operation amount (Sb) is greater than or equal to a first brake operation brake amount (Sb1), which corresponds to the first predetermined vehicle speed (V1); and
using a sum of the brake operation brake torque (Tb) and a calculated accelerator operation brake torque (Ta'), the calculated accelerator operation brake torque (Ta') being calculated to approach the accelerator operation brake torque (Ta) from the first accelerator operation brake torque (Ta1) in accordance with a reduction ratio of the brake operation amount (Sb), when the vehicle speed (V) is less than or equal to the first predetermined vehicle speed (V1) and the brake operation brake amount (Sb) is less than the first brake operation brake amount (Sb1).

2. The method of controlling a coordinated regenerative brake system of a vehicle according to claim 1, further comprising:
when the vehicle speed (V) is less than or equal to the first predetermined vehicle speed (V1) when the brake operation begins, and the brake operation amount (Sb) is increasing, controlling the desired brake torque (Tq) using a sum of the brake operation brake torque (Tb) and a second accelerator operation brake torque (Ta2), which is equivalent to the engine brake torque at the start of the brake operation; and
when the vehicle speed (V) is less than or equal to the first predetermined vehicle speed (V1) when the brake operation begins, and the brake operation amount (Sb) is decreasing, controlling the desired brake torque (Tq) using a sum of the brake operation brake torque (Tb) and a second calculated accelerator operation brake torque (Ta"), the second calculated accelerator operation brake torque (Ta") being calculated to approach the accelerator operation brake torque (Ta) from the second accelerator operation brake torque (Ta2) in accordance with a reduction ratio of the brake operation amount (Sb) from a relative maximum brake operation amount.

3. The method of controlling a coordinated regenerative brake system of a vehicle according to claim 2, the second calculated accelerator operation brake torque (Ta") being determined according to the following relationship:

$$Ta''=[(Ta2-Ta)/Tb2]\times Tb+Ta$$

wherein Tb2 is a second brake operation brake torque corresponding to the second brake operation brake amount (Sb2).

4. The method of controlling a coordinated regenerative brake system of a vehicle according to claim 1, the calculated accelerator operation brake torque (Ta') being determined according to the following relationship:

$$Ta'=[(Ta1-Ta)/Tb1]\times Tb+Ta$$

wherein Tb1 is a first brake operation brake torque corresponding to the first brake operation brake amount (Sb1).

5. A method of controlling a desired brake torque (Tq) of a vehicle by coordinating a friction brake torque and a regenerative brake torque in a regenerative brake system, the friction brake torque comprising a brake operation brake torque (Tb) responsive to a brake operation amount (Sb) and the regenerative brake torque comprising an accelerator operation brake torque (Ta) responsive to an accelerator operation amount (Sa) and being equivalent to an engine brake torque working on the vehicle, the method comprising:
when a speed of the vehicle (V) is less than or equal to a first predetermined vehicle speed (V1), and when the accelerator operation amount (Sa) is effectively zero and no brake operation amount (Sb) is made, controlling the desired brake torque (Tq) using the accelerator operation brake torque (Ta) to approach zero in accordance with the vehicle speed (V); and
when the vehicle speed (V) is greater than the predetermined vehicle speed (V1) and a brake operation begins, controlling the desired brake torque (Tq) using a sum of the brake operation brake torque (Tb) and the accelerator operation brake torque (Ta), and when the vehicle speed (V) slows to equal to or less than the predetermined vehicle speed (V1) during the braking operation, controlling the desired brake torque (Tq):
using a sum of the brake operation brake torque (Tb) and a first accelerator operation brake torque (Ta1), which is equivalent to the engine brake torque at the first predetermined vehicle speed (V1), when the brake operation amount (Sb) is greater than or equal to a first brake operation brake amount (Sb1) corresponding to the first predetermined vehicle speed (V1); and
using a sum of the brake operation brake torque (Tb) and a calculated accelerator operation brake torque (Ta'), which is calculated to approach the accelerator operation brake torque (Ta) from the first accelerator operation brake torque (Ta1) in accordance with a reduction ratio of the brake operation amount (Sb), when the brake operation brake amount (Sb) is less than the first brake operation brake amount (Sb1).

6. The method of controlling a desired brake torque (Tq) of a vehicle according to claim 5, when the vehicle speed (V) is less than or equal to the first predetermined vehicle speed (V1) and the brake operation begins, the method further comprising:
when the brake operation amount (Sb) is increasing, controlling the desired brake torque (Tq) using a sum of the brake operation brake torque (Tb) and a second accelerator operation brake torque (Ta2), which is equivalent to the engine brake torque at a start of the brake operation; and
when the brake operation amount (Sb) is decreasing, controlling the desired brake torque (Tq) using a sum of the brake operation brake torque (Tb) and a second calculated accelerator operation brake torque (Ta"), the second calculated accelerator operation brake torque (Ta") being calculated to approach the accelerator operation brake torque (Ta) from the second accelerator operation brake torque (Ta2) in accordance with a reduction ratio of the brake operation amount (Sb) from a relative maximum brake operation amount.

7. The method of controlling a desired brake torque (Tq) of a vehicle according to claim 6, the calculated accelerator operation brake torque (Ta') being determined according to the following relationship:

$$Ta'=[(Ta2-Ta)/Tb2]\times Tb+Ta$$

wherein Tb2 is a second brake operation brake torque corresponding to the second brake operation brake amount (Sb2).

8. The method of controlling a desired brake torque (Tq) of a vehicle according to claim 7, the calculated accelerator operation brake torque (Ta') being determined according to the following relationship:

$$Ta'=[(Ta1-Ta)/Tb1] \times Tb+Ta$$

wherein Tb1 is a first brake operation brake torque corresponding to the first brake operation brake amount (Sb1).

9. A method of controlling a desired brake torque (Tq) of a vehicle during a braking operation by coordinating a friction brake torque and a regenerative brake torque in a regenerative brake system, when a vehicle speed (V) is greater than a predetermined vehicle speed (V1) when the braking operation begins, the friction brake torque comprising a brake operation brake torque (Tb) responsive to a brake operation amount (Sb) and the regenerative brake torque comprising an engine brake equivalent brake torque (Ta) responsive to an accelerator operation amount (Sa), the method comprising:

when the vehicle speed (V) is greater than the predetermined vehicle speed (V1), controlling the desired brake torque (Tq) using a sum of the brake operation brake torque (Tb) nd the engine brake equivalent brake torque (Ta); and when the vehicle speed (V) slows to equal to or less than the predetermined vehicle speed (V1) during the braking operation, controlling the desired brake torque (Tq):

using a sum of the brake operation brake torque (Tb) and a first engine brake equivalent brake torque (Ta1), which is equivalent to the engine brake torque at the first predetermined vehicle speed (V1), when the brake operation amount (Sb) is greater than or equal to a first brake operation brake amount (Sb1) corresponding to the first predetermined vehicle speed (V1); and using a sum of the brake operation brake torque (Tb) and a calculated engine brake equivalent brake torque (Ta'), which is calculated to approach the accelerator operation brake torque (Ta) from the first engine brake equivalent brake torque (Ta1) in accordance with a reduction ratio of the brake operation amount (Sb), when the brake operation brake amount (Sb) is less than the first brake operation brake amount (Sb1).

10. A method of controlling a desired brake torque (Tq) of a vehicle during a braking operation by coordinating a friction brake torque and a regenerative brake torque in a regenerative brake system, when a vehicle speed (V) is less than or equal to a predetermined vehicle speed (V1) when the braking operation begins, the friction brake torque comprising a brake operation brake torque (Tb) responsive to a brake operation amount (Sb) and the regenerative brake torque comprising an engine brake equivalent brake torque (Ta) responsive to an accelerator operation amount (Sa), the method comprising:

when the brake operation amount (Sb) is increasing, controlling the desired brake torque (Tq) using a sum of the brake operation brake torque (Tb) and a second accelerator operation brake torque (Ta2), which is equivalent to the engine brake torque at a start of the brake operation; and when the brake operation amount (Sb) is decreasing, controlling the desired brake torque (Tq) using a sum of the brake operation brake torque (Tb) and a second calculated accelerator operation brake torque (Ta"), the second calculated accelerator operation brake torque (Ta") being calculated to approach the accelerator operation brake torque (Ta) from the second accelerator operation brake torque (Ta2) in accordance with a reduction ratio of the brake operation amount (Sb) from a relative maximum brake operation amount.

* * * * *

UNITED STATES PATENT AND TRADEMARK OFFICE
CERTIFICATE OF CORRECTION

PATENT NO. : 6,508,523 B2
DATED : February 21, 2003
INVENTOR(S) : M. Yoshino

It is certified that error appears in the above-identified patent and that said Letters Patent is hereby corrected as shown below:

<u>Column 17,</u>
Line 5, "claim 7" should be -- claim 5 --.
Line 26, "nd" should be -- and --.

Signed and Sealed this

Twentieth Day of January, 2004

JON W. DUDAS
*Acting Director of the United States Patent and Trademark Office*